United States Patent Office 3,119,321
Patented Jan. 28, 1964

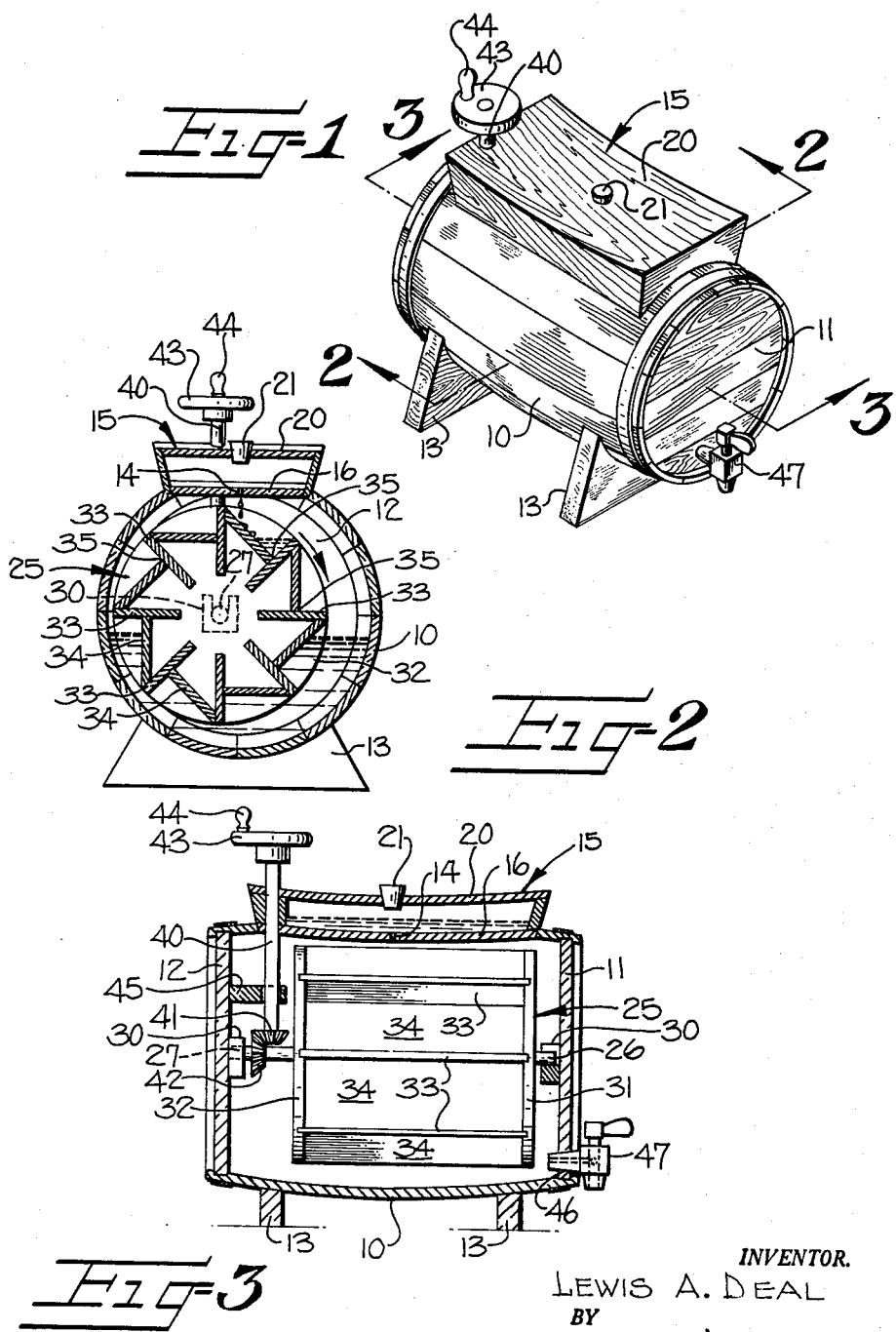

3,119,321
APPARATUS FOR AGING ALCOHOLIC SPIRITS
Lewis A. Deal, 2100 E. North St., Greenville, S.C.
Filed Oct. 4, 1962, Ser. No. 228,283
7 Claims. (Cl. 99—277.1)

This invention relates to a new and improved apparatus for aging alcoholic spirits, and more particularly whiskey.

Alcoholic spirits, such as whiskey, as is well known, are aged in internally charred wooden barrels which are usually made from oak. The interaction between the alcoholic spirits and the charred wood surfaces has a purifying effect upon the alcoholic spirits and imparts a mellow and smooth flavor to the alcoholic spirits, rendering them more palatable for human consumption.

It has been recognized that more effective aging of the alcoholic spirits can be obtained when a substantial area of charred wood surface is brought into contact with the alcoholic spirits, and various proposals for increasing the area of such contact have been advanced. Such proposals have included the provision of a replaceable charred wood insert within the barrel having internally charred wood surfaces so as to increase the over-all area of charred wood surface in contact with the alcoholic spirits to be aged which are contained within the barrel. However, such charred wood inserts, while contributing to an increase in the total area of charred wood surface capable of being brought into contact with the alcoholic spirits to be aged, impede free circulation of the alcoholic spirits within the barrel as they undergo the aging process to delay its completion due to the inability of all portions of the alcoholic spirits to be brought into intimate contact with the charred wood surfaces for substantially equal periods of time.

It is therefore an object of this invention to provide a new and improved apparatus for aging alcoholic spirits, such as whiskey, wherein a rotatable paddle wheel is placed within the confines of a barrel for containing alcoholic spirits to agitate the contents of the barrel as they are undergoing aging, with the paddle wheel being so constructed as to be rotated within the barrel as an additional supply of alcoholic spirits is admitted into the barrel. The rotatable paddle wheel and the internal surface of the barrel may comprise charred wood surfaces with the rotation of the paddle wheel, either induced by the admission of an additional supply of alcoholic spirits into the barrel or by manual turning of a hand wheel to operate a driving mechanism therefor, serving to freely circulate the alcoholic spirits within the barrel to hasten the aging process by bringing about a more intimate contact between all portions of the alcoholic spirits contained within the barrel with the charred wood surfaces of the barrel and the rotatable paddle wheel. It is contemplated that the improved apparatus for aging alcoholic spirits may be of special benefit in up-grading the quality of inexpensive whiskeys by providing for further aging of such whiskeys to enhance the mellowness and bouquet thereof for improving their flavor during storage, while they await consumption.

One of the objects of the invention having been stated, other objects will appear as the description proceeds when taken in connection with the accompanying drawings, in which—

FIGURE 1 is a perspective view of the improved apparatus for aging alcoholic spirits in accordance with the present invention;

FIGURE 2 is a transverse vertical sectional view taken along the line 2—2 in FIGURE 1; and FIGURE 3 is a longitudinal vertical sectional view taken along the line 3—3 in FIGURE 1.

Referring more specifically to the drawings, the apparatus for aging alcoholic spirits includes a wooden container comprising a barrel 10 which is preferably constructed of oak. The barrel 10 has opposite ends or heads 11, 12 and is supported in a horizontally extending position by a pair of base members 13, 13, each of which is provided with a concavely curved upper surface for supporting the barrel 10 in cradling relationship with respect thereto.

An inlet opening 14 is provided in the barrel 10 at the upwardly disposed portion thereof for admitting raw liquor or inexpensive whiskey to the interior of the barrel 10 to undergo aging while contained therein. Preferably, the inlet opening 14 is actually formed in the bottom wall 16 of an elongate auxiliary reservoir 15 which is mounted on the upwardly disposed portion of the barrel 10 and extends lengthwise between the opposite ends 11, 12 thereof. Thus, in FIGURE 3, it will be observed that the auxiliary reservoir 15 is fixed within a cut-out portion having arcuately curved ends formed in the upwardly disposed portion of the barrel 10. The bottom wall 16 of the auxiliary reservoir 15 is contiguous with the portions of the barrel 10 bounding the cut-out formed therein and is concavely "dished," by having a slight progressively increasing depression extending inwardly from each end thereof and leading to the medially located inlet opening 14 therethrough. The inlet opening 14 through the bottom wall 16 of the auxiliary reservoir 15 provides communication between the interior of the auxiliary reservoir 15 and the interior of the barrel 10. Raw liquor or inexpensive whiskey is admitted into the auxiliary reservoir 15 through a filler opening formed in the top wall 20 thereof, the filler opening being normally closed by a plug or stopper 21.

An agitator member is mounted internally of the barrel 10 for rotation therewithin to freely circulate the alcoholic spirits within the barrel 10, the agitator member taking the form of a paddle wheel construction 25 having stub axles 26, 27 extending outwardly from its opposite ends and respectively mounted for rotation within channel-shaped bearing blocks 30, 30 fixedly secured to the internal surfaces of the barrel ends 11, 12. The paddle wheel 25 comprises a pair of circular disks 31, 32 at the opposite ends thereof from which the stub axles 26, 27 respectively extend outwardly, a plurality of equally spaced radial vanes 33 extending between the circular disks 31, 32 and having their opposite ends respectively fixed within suitable notches formed in the proximal surfaces of the circular disks 31, 32, and a plurality of cross members 34 also extending between the circular disks 31, 32 with their opposite ends respectively fixed within suitable notches formed in the proximal surfaces of the circular disks 31, 32.

Referring to FIGURE 2, it will be seen that the cross members 34 interconnect adjacent radial vanes 33, each of the cross members 34 being connected along one side thereof to the radially outwardly disposed end of one vane 33 and along the other side thereof to a position intermediate the ends of an adjacent radial vane 33. Therefore, the circular end disks 31, 32, the radial vanes 33, and the cross members 34 cooperate to define a plurality of circumferentially arranged elongate cavities or pockets 35 about the periphery of the paddle wheel 25. The axis of the paddle wheel 25, as determined by the stub axles 26, 27 which are received for rotation within the channel-shaped bearing blocks 30, 30 secured to the internal surfaces of the barrel ends 11, 12, is preferably disposed in offset parallel relationship to the longitudinal axis of the barrel 10 and out of vertical alinement with the inlet opening 14 through the bottom wall 16 of the auxiliary reservoir 15.

An elongate vertical shaft 40 extends through the rear end wall of the auxiliary reservoir 15 and within the interior of the barrel 10, the inner end of the shaft 40 having a beveled gear 41 fixed thereon for cooperation with a complementary beveled gear 42 fixedly mounted on the stub axle 27 of the paddle wheel 25. The beveled gear 42 is disposed at right angles to the beveled gear 41 on the inner end of the shaft 40 and in meshing relationship therewith. A hand wheel 43 having a knob 44 thereon is rigidly affixed to the outer end of the shaft 40 so as to be disposed above the top wall 20 of the auxiliary reservoir 15 at the rear end thereof. The barrel end 12 preferably carries an apertured shaft support member 45 on its internal surface, the shaft support member 45 extending laterally inwardly of the head 12 and loosely receiving the shaft 40 through its aperture to provide support therefor for maintaining the gear 41 on the shaft 40 in meshing engagement with the gear 42 on the axle 27 of the paddle wheel 25. It will be understood that the hand wheel 43 may be turned by grasping the knob 44 to rotate the shaft 40 for imparting rotation to the agitator member or paddle wheel 25 through the driving connection provided by the meshing gears 41, 42. Thus, means are provided for manually rotating the agitator member or paddle wheel 25, such means including the rotatable shaft 40, the hand wheel 43 and knob 44 secured to the outer end thereof, and the meshing gears 41, 42 respectively fixed on the inner end of the shaft 40 and about the axle 27.

An outlet opening 46 is provided in the lower portion of the barrel end 11 for dispensing alcoholic spirits from the barrel 10, the outlet opening 46 being equipped with a normally closed, manually operable petcock valve 47 which may be opened for dispensing the contents from the barrel 10 through the outlet opening 46 when desired.

In operating the improved apparatus for aging alcoholic spirits, it will be understood that liquor may be admitted into the interior of the barrel 10 by removing the plug 21 from the filler opening in the top wall 20 of the auxiliary reservoir 15 and pouring the liquor through the filler opening where it enters the interior of the barrel 10 through the inlet opening 14 formed in the bottom wall 16 of the auxiliary reservoir 15. The inlet opening 14 is preferably of relatively small size so as to admit the liquor into the interior of the barrel 10 rather slowly, with the supply of liquor contained in the auxiliary reservoir 15 being continually directed toward the inlet opening 14 by the concave dished shape of the bottom wall 16 in which the inlet opening 14 is formed.

As the liquor enters the interior of the barrel 10, it will be observed that the individual pockets 35 formed about the periphery of the paddle wheel 25 respectively accumulate a quantity of the liquor admitted into the barrel 10 in progressive sequence to impart rotation to the paddle wheel 25. This rotation of the paddle wheel 25 induced by the admission of liquor to the interior of the barrel 10 serves to stir or agitate the liquor already contained within the barrel 10 for hastening the aging process by providing for free circulation of the liquor within the barrel 10. In this respect, the positioning of the paddle wheel 25 within the barrel 10 so that its longitudinal axis is in offset parallel relationship with respect to the longitudinal axis of the barrel 10 and out of vertical alinement with the inlet opening 14 causes the liquor entering the interior of the barrel 10 through the inlet opening 14 provided in the bottom wall 16 of the auxiliary reservoir 15 to fill the pockets 35 formed about the periphery of the paddle wheel 25 in sequence, each of the pockets 35 when being so filled with a quantity of liquor imparting an increment of rotation to the paddle wheel 25.

The rotation of the paddle wheel 25 within the barrel 10 brought about by the pouring of liquor through the filler opening in the top wall 20 of the auxiliary reservoir 15 is visually indicated by the rotation of the hand wheel 43 in response thereto because of the meshing relationship between the gears 41, 42, since the gear 42 rotates with the paddle wheel 25 to drive the gear 41. Should the hand wheel 43 remain stationary as additional liquor is poured into the auxiliary reservoir 15 for admittance through the inlet opening 14 into the barrel 10, this will signify that the barrel 10 is substantially filled and that agitation or stirring of the contents therein must be accomplished by grasping the knob 44 and manually turning the hand wheel 43 to rotate the shaft 40 for imparting rotation to the paddle wheel 25 through the driving connection provided by the meshing gears 41, 42. Of course, it will be understood that agitation of the contents within the barrel 10 may be accomplished at any time without pouring additional liquor through the filler opening of the auxiliary reservoir 15 by manually turning the hand wheel 43 in the manner described.

Like the barrel 10, the components of the paddle wheel 25 are constructed of wooden material, preferably oak. The interior of the barrel 10 and the surfaces of the paddle wheel 25 exposed to contact with the alcoholic spirits contained in the barrel 10 are charred to present a substantial area of charred wood surface which is brought into intimate contact with the alcoholic spirits contained within the barrel 10. In this respect, the other components of the apparatus disposed within the barrel 10, including the shaft 40, the gears 41, 42, the channel-shaped bearing blocks 30, 30, and the shaft support member 45 are also preferably constructed of wooden material.

It will therefore be seen that I have disclosed a new and improved apparatus for aging alcoholic spirits which may be utilized for aging raw liquor or for up-grading the quality of an inexpensive whiskey by subjecting it to further aging. The intermittent but frequent agitation of the alcoholic spirits within the barrel 10 brought about by the addition of quantities of alcoholic spirits to the alcoholic spirits already contained in the barrel 10 hastens the aging process by improving the circulation of the alcoholic spirits within the barrel 10 to bring all portions of the alcoholic spirits into intimate contact with the substantial area of charred wood surface afforded within the barrel 10.

In the drawings and specification there has been set forth a preferred embodiment of the invention and, although specific terms are employed, they are used in a generic and descriptive sense only and not for purposes of limitation, the scope of the invention being defined in the claims.

I claim:
1. An apparatus for aging alcoholic spirits comprising
   (a) a container adapted to receive alcoholic spirits therein,
   (b) said container having an opening formed therein through which alcoholic spirits are to be admitted to the interior of the container,
   (c) an agitator member rotatably mounted within said container,
   (d) said agitator member being disposed within said container with respect to the opening so as to be subjected to the flow of alcoholic spirits thereon when alcoholic spirits enter said container through the opening,
   (e) at least one of said barrel and said agitator member being provided with aging means adapted to contact alcoholic spirits contained within said container, and
   (f) said agitator member being provided with plural means adapted to be acted upon in sequence by alcoholic spirits entering said container through the opening for inducing rotation of said agitator member.

2. An apparatus for aging alcoholic spirits comprising
   (a) a container adapted to receive alcoholic spirits therein, (b) said container having an opening formed therein through which alcoholic spirits are to be admitted to the interior of the container, (c) an agitator member rotatably mounted within said container, (d) said agitator member being disposed within said container beneath the opening with a portion of said agitator member offset from its axis of rotation being in vertical alinement with the opening to continually subject said agitator member to the flow of alcoholic spirits thereon when alcoholic spirits enter said container through the opening, (e) at least one of said barrel and said agitator member being provided with aging means adapted to contact alcoholic spirits contained within said container, and (f) said agitator member being provided with plural means adapted to be acted upon in sequence by alcoholic spirits entering said container through the opening for inducing rotation of said agitator member.

3. An apparatus for aging alcoholic spirits comprising (a) a wooden barrel adapted to contain alcoholic spirits therein, (b) said barrel having an opening formed therein through which alcoholic spirits are adapted to be admitted into the interior of said barrel, (c) a wooden agitator member rotatably mounted within said barrel in a position subjecting it to the flow of alcoholic spirits entering said barrel through the opening, (d) at least one of said barrel and said agitator member having charred surfaces adapted to contact alcoholic spirits contained within said barrel, (e) said agitator member having a plurality of pockets formed about its periphery for sequentially receiving quantities of alcoholic spirits entering said barrel through the opening, and (f) said agitator member being rotated in response to the sequential filling of the pockets by alcoholic spirits entering said barrel through the opening.

4. An apparatus for aging alcoholic spirits comprising (a) a wooden barrel adapted to contain alcoholic spirits therein, (b) said barrel having an opening formed therein through which alcoholic spirits are adapted to be admitted into the interior of said barrel, (c) a wooden agitator member rotatably mounted within said barrel beneath the opening with a portion of said agitator member offset from its axis of rotation being in vertical alinement with the opening to continually subject said agitator member to the flow of alcoholic spirits thereon when alcoholic spirits enter said barrel through the opening, (d) at least one of said barrel and said agitator member having charred surfaces adapted to contact alcoholic spirits contained within said barrel, (e) said agitator member having a plurality of pockets formed about its periphery for sequentially receiving quantities of alcoholic spirits entering said barrel through the opening, and (f) said agitator member being rotated in response to the sequential filling of the pockets by alcoholic spirits entering said barrel through the opening.

5. An apparatus for aging alcoholic spirits comprising (a) a wooden barrel adapted to contain alcoholic spirits therein, (b) an auxiliary reservoir mounted on the upwardly disposed portion of said barrel and having a bottom wall contiguous with the upwardly disposed portion of said barrel and forming a part thereof, (c) said bottom wall of said auxiliary reservoir having an opening formed therein communicating with the interior of said barrel, (d) a wooden agitator member rotatably mounted within said barrel beneath the opening with a portion of said agitator member offset from its axis of rotation being in vertical alinement with the opening, (e) at least one of said barrel and said agitator member having charred surfaces adapted to contact alcoholic spirits contained within said barrel, (f) said agitator member having a plurality of pockets formed about its periphery for sequentially receiving quantities of alcoholic spirits entering said barrel through the opening, and (g) said agitator member being rotated in response to the sequential filling of the pockets of said agitator member by alcoholic spirits entering said barrel through the opening in the bottom wall of said auxiliary reservoir upon initially pouring alcoholic spirits into said auxiliary reservoir.

6. An apparatus for aging alcoholic spirits comprising (a) a wooden barrel adapted to contain alcoholic spirits therein, (b) said barrel having an opening formed therein through which alcoholic spirits are adapted to be admitted into the interior of said barrel, (c) a wooden agitator member having an axle fixed with respect thereto, (d) means mounting said axle and said agitator member for rotation within said barrel, (e) said agitator member being disposed in a position subjecting it to the flow of alcoholic spirits entering said barrel through the opening, (f) at least one of said barrel and said agitator member having charred surfaces adapted to contact alcoholic spirits contained within said barrel, (g) said agitator member having a plurality of pockets formed about its periphery for sequentially receiving quantities of alcoholic spirits entering said barrel through the opening, (h) a first gear fixed on said axle, (i) a second gear engaging said first gear in meshing relationship for providing a continuous driving connection therebetween, (j) a rotatable shaft extending outwardly of said barrel and having an end within said barrel to which said second gear is fixed, (k) said agitator member being rotated in response to the sequential filling of the pockets by alcoholic spirits entering said barrel through the opennig, and (l) said axle and said first gear fixed thereon rotating with said agitator member to drive said second gear fixed on said shaft for rotating said shaft to provide visual indication of the rotation of said agitator member within said barrel.

7. An apparatus for aging alcoholic spirits comprising (a) a wooden barrel adapted to contain alcoholic spirits therein, (b) an auxiliary reservoir mounted on the upwardly disposed portion of said barrel and having a bottom wall contiguous with the upwardly disposed portion of said barrel and forming a part thereof, (c) said bottom wall of said auxiliary reservoir having an opening formed therein communicating with the interior of said barrel, (d) a wooden agitator member having an axle fixed with respect thereto, (e) means mounting said axle and said agitator member for rotation within said barrel, (f) said agitator member being disposed beneath the opening with a portion of said agitator member offset from its axis of rotation being in vertical alinement with the opening, (g) at least one of said barrel and said agitator member having charred surfaces adapted to contact alcoholic spirits contained within said barrel, (h) said agitator member having a plurality of pockets formed about its periphery for sequentially receiving quantities of alcoholic spirits entering said barrel through the opening, (i) a first gear fixed on said axle, (j) a second gear engaging said first gear in meshing relationship for providing a continuous driving connection therebetween, (k) a rotatable shaft having one end disposed within said barrel to which said second gear is fixed and having its other end disposed in a visible position outwardly of said barrel and said auxiliary reservoir, (l) said agitator member being rotated in response to the sequential filling of the pockets of said agitator member by alcoholic spirits entering said barrel through the opening in the bottom wall of said auxiliary reservoir upon initially pouring alcoholic spirits into said auxiliary reservoir, and (m) said axle and said first gear fixed thereon rotating with said agitator member to drive said second gear fixed on said shaft for rotating said shaft to provide visual indication of the rotation of said agitator member within said barrel.

References Cited in the file of this patent
UNITED STATES PATENTS

| | | |
|---|---|---|
| 418,792 | Hasbrouck | Jan. 7, 1890 |
| 2,091,030 | Davis | Aug. 24, 1937 |